United States Patent
Iba et al.

(10) Patent No.: US 6,258,184 B1
(45) Date of Patent: Jul. 10, 2001

(54) HYDROGEN-ABSORBING ALLOY

(75) Inventors: Hideki Iba, Toyota; Toshihiro Mori, Okazaki; Yasuhide Kurimoto, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/289,993

(22) Filed: Apr. 13, 1999

(30) Foreign Application Priority Data

May 21, 1998 (JP) .................................................. 10-139856

(51) Int. Cl.$^7$ .................................................. C22C 14/00
(52) U.S. Cl. .................. 148/421; 420/900; 420/580; 420/417; 420/434; 420/75; 420/127; 420/422
(58) Field of Search .................. 420/900, 580, 420/417, 434, 75, 127, 422; 148/421

(56) References Cited

U.S. PATENT DOCUMENTS

| | | | | |
|---|---|---|---|---|
| 4,111,689 | * | 9/1978 | Liu ........................................... | 75/122 |
| 4,278,466 | | 7/1981 | de Pous ................................. | 75/175.5 |
| 4,283,226 | | 8/1981 | van Mal et al. ..................... | 75/175.5 |
| 5,541,017 | * | 7/1996 | Hong et al. .............................. | 429/59 |
| 6,048,644 | * | 4/2000 | Tsuji et al. ......................... | 429/218.2 |

FOREIGN PATENT DOCUMENTS

| | | |
|---|---|---|
| 0 011 602A1 | 5/1980 | (EP) . |
| 2 331 623 | 6/1977 | (FR) . |
| 2 10659A1 | 1/1990 | (JP) . |
| 2-10659 | 1/1990 | (JP) . |
| 4-337045 | 11/1992 | (JP) . |
| 6-93366 | 4/1994 | (JP) . |
| WO9108167A1 | 6/1991 | (WO) . |

\* cited by examiner

*Primary Examiner*—Roy King
*Assistant Examiner*—Nicole Coy
(74) *Attorney, Agent, or Firm*—Burns, Doane, Swecker & Mathis, LLP

(57) ABSTRACT

A BCC type hydrogen-absorbing alloy, which uses a ferroalloy, is advantageous from the aspect of the production cost and exhibits excellent hydrogen absorption and desorption characteristics due to a fine structure constituted by spinodal decomposition even when the iron component is increased. The hydrogen-absorbing alloy is expressed by the general formula $A_x Va_y B_z$, where A is at least one of Ti and Zr, Va is at least one member of the Group Va elements of the Periodic Table consisting of V, Nb and Ta, and B contains at least Fe and is at least one member selected from the group consisting of Cr, Mn, Co, Ni, Cu, Al, Mo and W, each of x, y and z satisfies the relation, in terms of of the atomic number ratio, $0 \leq x \leq 70$, $0 \leq y \leq 50$, $x+y+z=100$, and $x/z=0.25$ to 2.0, the phase of the body-centered cubic structure is at least 50% in terms of the phase fraction and its lattice constant is at least 0.2950 nm but not greater than 0.3100 nm.

5 Claims, 2 Drawing Sheets

HYDROGEN-ABSORBING ALLOY

BACKGROUND OF THE INVENTION

1. Field of the Invention

This invention relates to a BCC type hydrogen-absorbing alloy. More particularly, this invention relates to a hydrogen-absorbing alloy which uses a ferroalloy, is therefore advantageous cost-wise, and has excellent hydrogen absorption and desorption characteristics due to a fine structure formed by spinodal decomposition even when the iron component is increased.

2. Description of the Prior Art

As means for storing and transporting hydrogen, a hydrogen-absorbing alloy can absorb a hydrogen gas to a capacity more than about 1,000 times the volume of the alloy itself, and its volume density is equal to, or greater than, that of liquid or solid hydrogen. It has long been known that metals and alloys having a body-centered cubic structure (hereinafter called the "BCC" structure) such as V, Nb, Ta and a Ti-V alloy absorb and store greater amounts of hydrogen than $AB_5$ type alloys such as $LaNi_5$ and $AB_2$ type alloys such as $TiMn_2$ that have been already put into practical application. This is because the number of hydrogen absorbing sites in the crystal lattice of the BCC structure is large, and the hydrogen absorbing capacity according to calculation is as great as H/M=2.0 (about 4.0 wt % in alloys of Ti or V having an atomic weight of about 50).

A pure vanadium alloy absorbs about 4.0 wt % which is substantially the same as the value calculated from the crystal structure and emits about half at normal temperature and pressure. It is known that Nb and Ta that are elements in the same Group 5A of the Periodic Table exhibit similarly large hydrogen absorbing quantities and hydrogen desorption characteristics.

Pure metals of V, Nb, Ta, etc, are extremely expensive and these metals are not suitable for an industrial application, where a certain amount is necessary, such as a hydrogen tank, an Ni-MH (metallic hydride) cell, and so forth. Therefore, the characteristics of alloys falling within the component range in which they have a BCC structure, such as Ti-V, have been examined. However, in addition to the problems encountered in V, Nb and Ta in that the reaction rate is low and activation is difficult, their BCC alloys involve a new problem in that they only absorb hydrogen at a practical temperature and pressure but that their desorption amount is small. As a result, the alloys having the BCC phase as the main constituent phase have not yet been put into practical application.

Japanese Unexamined Patent Publication (Kokai) No. 2-10659 is one of the prior art references that describe the V-containing alloys described above. This reference teaches the use of a ferrovanadium to which V is added, for example, as the starting material. Japanese Unexamined Patent Publication (Kokai) No. 4-337045 describes a hydrogen-absorbing alloy which is expressed by the general formula $Ti_xCr_{2-y-z}V_yFe_z$, where $0.5 \leq x \leq 1.2$, $2.0 < y \leq 1.5$, $0 < z \leq 0.5$ and $0 < y+z < 2.0$.

Though the cost of these ferroalloys is low, they contain Fe as a component. Therefore, those alloy compositions should be developed so that the characteristics do not change or can be improved even when Fe is added afresh as a component.

SUMMARY OF THE INVENTION

The object of the present invention is to provide quaternary or quinary alloys using a Ti-V-Cr system having the BCC type structure as the basis and containing other alloy elements, and to provide a hydrogen-absorbing alloy which uses a ferroalloy as the starting material and has the excellent hydrogen absorption and desorption characteristics required for a hydrogen absorbing alloy even when Fe is mixed.

It is another object of the present invention to provide a hydrogen-absorbing alloy which makes it possible to exchange those elements which are effective for excellent hydrogen absorption and desorption characteristics under the utilizable environment, by examining all the combinations without fixing the atomic ratios with respect to the Ti, V and Cr described above to a constant ratio.

It is still another object of the present invention to provide a hydrogen-absorbing alloy capable of exhibiting excellent hydrogen absorption and desorption characteristics in hydrogen storage apparatuses, cells, etc, even in the quaternary or quinary multi-component systems, while the component system capable of keeping a periodical structure due to the spinodal decomposition is maintained as a fine structure.

The gist of the present invention will be described as follows.

(1) A hydrogen-absorbing alloy comprises a composition expressed by the following general formula:

$$A_xVa_yB_z,$$

where

A is at least one of Ti and Zr, Va is at least one of the Group Va elements of the Periodic Table consisting of V, Nb and Ta, B contains at least Fe and is at least one member selected from the group consisting of Cr, Mn, Co, Ni, Cu, Al, Mo and W, x, y and z satisfy the relations $0 \leq x \leq 70$, $0 \leq y \leq 50$, $x+y+z=100$ and $x/z=0.25$ to 2.0 in terms of the atomic number ratio;

the phase of a body-centered cubic structure which is at least 50% in terms of the phase fraction;

and the lattice constant which is 0.2950 nm to 0.3100 nm.

(2) A hydrogen-absorbing alloy according to item (1), wherein x/z is preferably 0.25 to 1.5.

(3) A hydrogen-absorbing alloy according to item (1), wherein x/z is further preferably 0.5 to 1.0.

(4) A hydrogen-absorbing alloy according to item (1), wherein a composition is expressed by $Ti_xV_yCr_{z1}Fe_{z2}$, where Z=Z1+Z2, x: 14 to 47, y: 16 to 40, and Z: 31 to 64 in terms of the atomic number ratio.

(5) A hydrogen-absorbing alloy according to item (1), wherein a composition is expressed by $Ti_xV_yMn_{z1}Fe_{z2}$, where Z=Z1+Z2, x: 15 to 40, y: 21 to 43, and Z: 27 to 64 in terms of the atomic number ratio.

(6) A hydrogen-absorbing alloy according to item (1), wherein a composition is expressed by $Ti_xV_yCr_{z1}Fe_{z2}Ni_{z3}$, where Z=Z1+Z2+Z3, x: 15 to 45, y: 15 to 40, and Z: 29 to 58 in terms of the atomic number ratio.

DETAILED DESCRIPTION OF THE PREFERRED EMBODIMENT

In conventional intermetallic compound type alloys, the third or fourth element is added while the ratio of x to y in the general formula $A_xB_y$ is kept fixed at 1:2 or 1:5. It is customary to assume the form of substitution of the original element and for this reason, the ratio of the constants is kept fixed.

Figure 1:
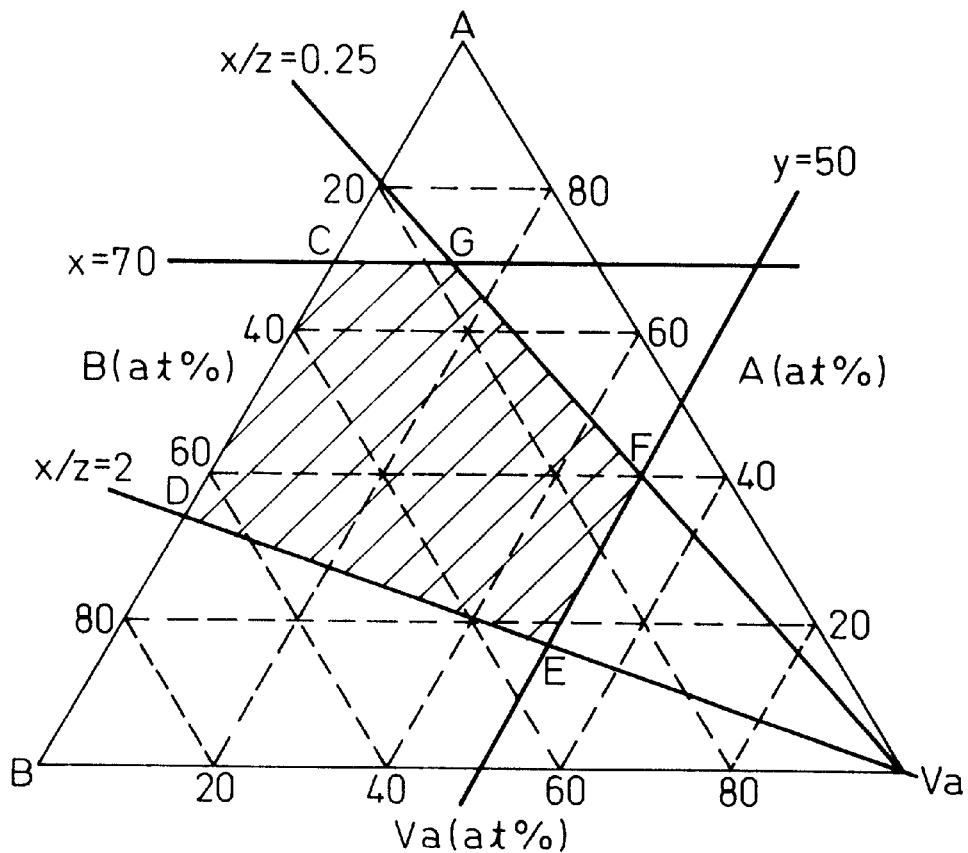
FIG. 1 is a diagram showing the composition range, by a pseudo-ternary phase diagram, of an alloy according to the present invention.

However, the atomic number ratio can be changed continuously in the case of the BCC alloys because they take the form of the solid solution. The present invention employs the quaternary or quinary alloys, stipulates each atomic number ratio to the specific range as described in the scope of the claim for patent from among a large number of combinations, and thus accomplishes the combinations of the specific elements. In other words, the preferred range in the present invention is the range encompassed by a polygon CDEFG in an A-B-Va system of a pseudo-ternary state diagram as shown in FIG. 1.

The point C in this polygon is the point of intersection between x=70 and the segment AB of the binary system, the point D is the point of intersection between x/z=2 and the segment AB, the points E and F are the points of intersection between y=50 and x/z=2 and x/z=0.25, respectively, and the point G is the point of intersection between x=70 and x/z=0.25. Among them, the segments x/z=2 and x/z=0.25 are determined by the range in which good results can be obtained, as illustrated in the later-appearing Examples, and the rest of the ranges are limited as the ranges in which the periodical structure due to the spinodal decomposition appears.

The inventors of the present invention have found from a large number of experiments that the hydrogen absorption and desorption characteristics can be improved remarkably in those alloys in which the phase of the body-centered cubic structure is regularly decomposed into a fine two-phase of a nano-order due to the spinodal decomposition among the BCC alloys, when x, y and z satisfy, in terms of the atomic number ratio, the relations $0 \leq x \leq 70$, $0 \leq y \leq 50$, $x+y+z=100$ and x/z=0.25 to 2.0, preferably 0.25 to 1.5 and further preferably, 0.5 to 1.0, and the phase of the body-centered cubic structure is at least 50% in terms of the phase fraction. In such alloys of the present invention, the crystal structure is the BCC, and the two phases, which are formed by the spinodal decomposition and are grown in the specific crystal orientations with different lattice constants, have the periodical structure with the spacing of 1.0 nm to 100 nm. This regular nano-order periodical structure allows a large quantity of hydrogen absorbed structurally in the BCC metal to be desorbed at a practical temperature and in a practical pressure range, mitigates the activation condition and improves the reaction rate. In the present invention, which is based on this observation, the interface of the two phases of the BCC alloy causing the spinodal decomposition enhances the movement of the hydrogen atoms, improves the reaction rate and facilitates activation. It is assumed, further, that stability of the hydrides decreases in the proximity of the interface due to the coherent strain between the two phases and this decrease results in an improvement in the hydrogen desorption characteristics.

The growth of the modulated structure due to this spinodal decomposition can be divided into the spinodal decomposition period in which the concentration amplitude is increased from the concentration fluctuation at the initial stage and the wavelength increasing period in which the wavelength of the resulting modulated structure is increased. In the alloy of the present invention the reaction in the spinodal decomposition period is extremely fast and this reaction is complete at the time of casting and solidification, or quenching after heat-treatment, and the modulated structure has already been formed. The present invention makes it possible to control the hydrogen absorption quantity and desorption characteristics, particularly, plateau flatness, by controlling the increase of the concentration wavelength after the decomposition has already been completed.

Referring to FIG. 1, the segment FG is a boundary line of the apparent lattice constant (mean lattice constant of two phases) of 0.3100 nm and the segment DE is a boundary line of the apparent lattice constant (mean lattice constant of two phases) of 0.2950 nm. The characteristics of both of the hydrogen absorption and desorption quantities cannot be satisfied outside the range encompassed by these two straight lines. Therefore, the present invention is limited to the range between both straight lines.

The factors that associate the fine structure with the hydrogen absorption quantity and desorption characteristics are presumably as follows:

(1) the concentration of the two phases formed by the increase of the concentration amplitude is different from the original alloy concentration; and (2) the interface of the two phases is a coherent interface in the spinodal decomposition period; therefore, the lattice distortion occurs to the extent corresponding to mis-fitting of the lattice constants of the two phases.

The mechanism of these factors in connection with the effects for the practical hydrogen absorption and desorption characteristics is assumed to be as follows.

Because the concentrations of the two phases are different as described above, their lattice constants are different by about 5/100 nm, and the change of the equilibrium pressure of hydrogen absorption and desorption resulting from this difference becomes extremely great. In other words, the plateaus of two stages are normally formed at each equilibrium pressure in the mixture of such two phases but in the alloy according to the present invention, a flat plateau is formed within a pressure range that can be used at a normal pressure. This is presumably because their interfaces cohere with each other and are continuous, and presumably because the hydrogen absorption and desorption characteristics, too, are continuous since the two phases are mixed at the nano-order.

The reasons for limitation of the alloy composition according to the present invention will be explained.

According to the determination method of the hydrogen absorbing-alloy of the inter-metallic compound type according to the prior art, x:y is 1:2 in the aforementioned $A_xB_y$ type, for example. Typical examples of such alloys are $TiMn_2$, $TiCr_2$, $ZrMn_2$, and the like. On the other hand, typical examples of the alloy having the ratio x:y=1:5 are $LaNi_5$, $MmNi_{3.55}Al_{0.3}Co_{0.75}Mn_{0.4}$, etc. Since the ratio of the A and B elements is constant in such inter-metallic compound type, the third and fourth elements, if they are added, mostly take the substitution form of the original elements, and the constant ratio remains constant.

In contrast, in the BCC alloy according to the present invention, the values x, y and z change continuously because the alloy is of the solid solution type. The alloy of the present invention is one that can absorb and desorb hydrogen under a utilizable environment and is selected from the BCC alloys having infinite combinations. In the present invention, too, alloys of several component systems determined by the method described above are examined. In other words, in the general formula $A_xVa_yB_z$, A is the component that can easily form a hydride and contains at least one of Ti and Zr. The element of the Group Va is at least one member selected from V, Nb and Ta as tabulated in the Periodic Table, and B is the component that with difficultly forms the hydride and is at least one member selected from the group consisting of Cr, Mn, Fe, Co, Ni, Cu, Al, Mo and W. Incidentally, x, y and z fall within the range in which hydrogen can be absorbed and desorbed in the environment capable of utilizing the hydrogen absorption and desorption characteristics, and their preferred ranges are $0 \leq x \leq 70$, $0 \leq y \leq 50$, $x+y+z=100$ and $x/z=0.25$ to 2.0 in terms of the atomic number ratio, as will be illustrated in the later-appearing Examples.

Hereinafter, the present invention will be explained in further detail with reference to Examples thereof.

EXAMPLE

This Example was carried out in order to examine the $A_xVa_yB_z$ type alloy composition. The samples of the hydrogen-absorbing alloys were produced in the following way. All the samples of the embodiment were ingots which had a weight of about 20 g and were molten by arc in a water cooling copper hearth. The data of the embodiment were obtained by pulverizing all the as-cast samples in air and subjecting them to four cycles of vacuum suction at 500° C. and $10^{-4}$ Torrs and hydrogen pressurization at +50 atm as the activation treatment. The hydrogen absorption quantity of alloys and their absorption and desorption characteristics were evaluated by determining the equilibrium pressure by the vacuum origin method stipulated by the pressure composition isothermal measurement method using the volumetric method (JIS H7201). The structural analysis of each alloy was conducted by using a transmission electron microscope and its accessory EDX (energy, dispersive X-ray spectrometer). Further, a crystal structure model of each alloy was prepared on the basis of the information obtained by the transmission electron microscope, and Rietveld analysis of the power X-ray diffraction data was conducted. Unlike the ordinary X-ray diffraction method, the Rietveld analysis could make the crystal structure parameters more precise by using the diffraction intensity and could determine the weight fraction of each phase by calculation.

Hereinafter each Example will be explained.

Example 1

The measurement described above was conducted in this Example for the Ti-V-Cr-Fe system alloys having the compositions tabulated in Table 1. The results were shown in FIG. 2 in terms of the relationship between an x/z value and the equilibrium pressure.

The alloy composition $Ti_{26.5}$-$V_{40.0}$-$Cr_{33.5}$ in Table 1 was the material proposed by the present inventors in Japanese Patent Application No. 8-281822. Though this material had excellent characteristics, it was out of the range of the present invention because it did not contain Fe.

It could be understood that other alloys contained Fe, had characteristics at least equivalent to those of the Ti-Cr-V ternary alloys and had excellent characteristics even when economical ferrovanadium, etc, was used as the starting material.

TABLE 1

| A | Va | B | | Equilibrium | |
|---|---|---|---|---|---|
| Ti | V | Cr | Fe | x/z | pressure |
| 26.5 | 40.0 | 33.5 |  | 0.79 | 0.6617 |
| 32.0 | 16.0 | 48.0 | 4.0 | 0.62 | 1.934 |
| 31.0 | 32.0 | 29.0 | 8.0 | 0.84 | 0.597 |
| 34.0 | 16.0 | 46.0 | 4.0 | 0.68 | 0.928 |
| 32.0 | 32.0 | 28.0 | 8.0 | 0.89 | 0.371 |
| 36.0 | 32.0 | 24.0 | 8.0 | 1.13 | 0.069 |
| 14.0 | 22.0 | 60.0 | 4.0 | 0.22 | 16.02 |
| 47.0 | 22.0 | 23.0 | 8.0 | 1.52 | 0.008 |

Figure 2:
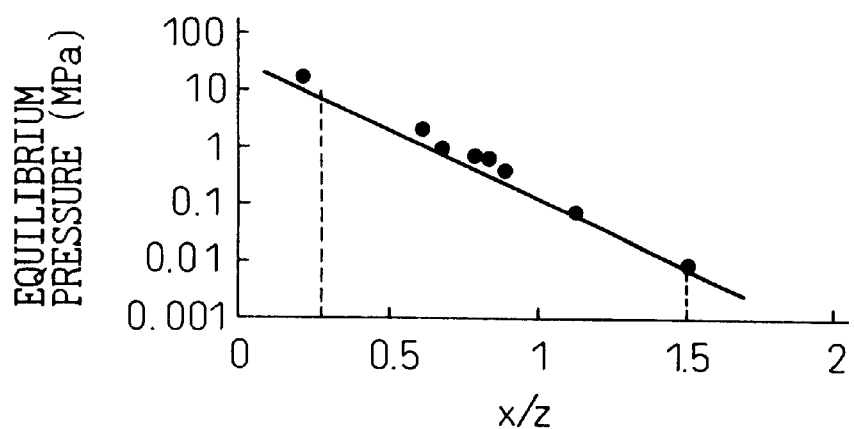
FIG. 2 is a diagram showing the relationship between an x/z value in a Ti-V-Cr-Fe system and an equilibrium pressure in Example 1 according to the present invention.

The value x in Table 1 and FIG. 2 is the sum of the group A elements and the value z is the sum of the group B elements. The equilibrium pressure is the value at the mid point of the plateau flat portion of a pressure-composition isothermal line at 40° C. In this case, when the equilibrium pressure falls within the range of 0.01 to 10 Mpa, it can be concluded that the alloys could be applied to hydrogen tanks and to negative electrode materials of Ni-MH cells by controlling the temperature and pressure in the system.

Furthermore, it could be confirmed that the alloys of Examples of the present invention exhibited the excellent equilibrium pressure described above, the phase of the body-centered cubic structure was at least 50% in terms of the phase fraction and its lattice constant was at least 0.2950 nm but was not greater than 0.3100 nm.

Example 2

In this Example, the measurement was carried out for Ti-V-Mn-Fe system alloys having the compositions tabulated in Table 2. The results were shown in FIG. 3 in terms of the relationship between the x/z value and the equilibrium pressure.

TABLE 2

| A | Va | B | | Equilibrium | |
|---|---|---|---|---|---|
| Ti | V | Mn | Fe | x/z | pressure |
| 26.0 | 40.0 | 34.0 |  | 0.76 | 0.522 |
| 33.0 | 34.0 | 29.0 | 4.0 | 1.00 | 0.214 |
| 40.0 | 33.0 | 19.0 | 8.0 | 1.48 | 0.005 |
| 30.0 | 43.0 | 19.0 | 8.0 | 1.11 | 0.052 |
| 15.0 | 21.0 | 60.0 | 4.0 | 0.23 | 6.223 |

Figure 3:
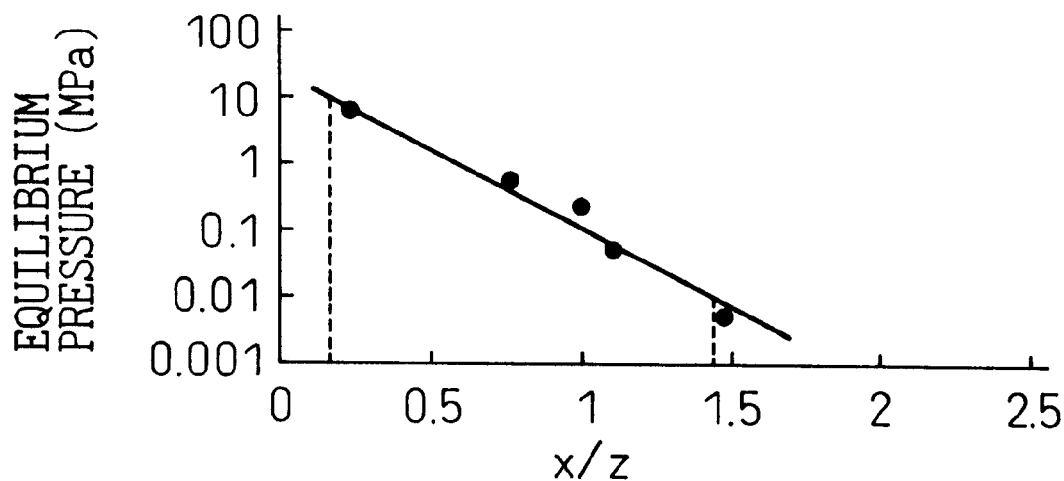
FIG. 3 is a diagram showing the relationship between the x/z value in a Ti-V-Mn-Fe system and the equilibrium pressure in Example 2 according to the present invention.

The x value in Table 2 and FIG. 3 is the sum of the group A elements and the z value is the sum of the group B elements. The equilibrium pressure was a value at the mid point of the plateau flat portion of the pressure-composition isothermal line at 40° C. In this case, when the equilibrium pressure fell within the range of 0.01 to 10 Mpa, it can be judged that the alloys could be applied to hydrogen tanks and to negative electrode materials of Ni-MH cells by controlling the temperature and pressure in the system.

Furthermore, it could be confirmed that the alloys of this Example exhibited the excellent equilibrium pressure described above, the phase of the body-centered cubic structure was at least 50% in terms of the phase fraction, and its lattice constant was at least 0.2950 nm but was not greater than 0.3100 nm.

Example 3

In this Example, the measurement described above was carried out for the Ti-V-Cr-Fe-Ni system alloys having the compositions tabulated in Table 3. The results were shown in FIG. 4 in terms of the relationship between the x/z value and the equilibrium pressure.

TABLE 3

| A | Va | B | | | | Equilibrium |
|---|---|---|---|---|---|---|
| Ti | V | Cr | Fe | Ni | x/z | pressure |
| 26.5 | 39.0 | 25.0 | 8.0 | 2.0 | 0.74 | 0.6617 |
| 30.0 | 35.0 | 28.0 | 5.0 | 2.0 | 0.86 | 0.597 |
| 35.0 | 15.0 | 42.0 | 4.0 | 4.0 | 0.70 | 0.902 |
| 32.0 | 32.0 | 20.0 | 8.0 | 8.0 | 0.89 | 0.201 |
| 33.0 | 38.0 | 17.0 | 8.0 | 4.0 | 1.14 | 0.063 |
| 15.0 | 27.0 | 50.0 | 4.0 | 4.0 | 0.26 | 16.02 |
| 20.0 | 40.0 | 28.0 | 8.0 | 4.0 | 0.50 | 4.23 |
| 45.0 | 24.0 | 25.0 | 3.0 | 3.0 | 1.45 | 0.008 |

Figure 4:
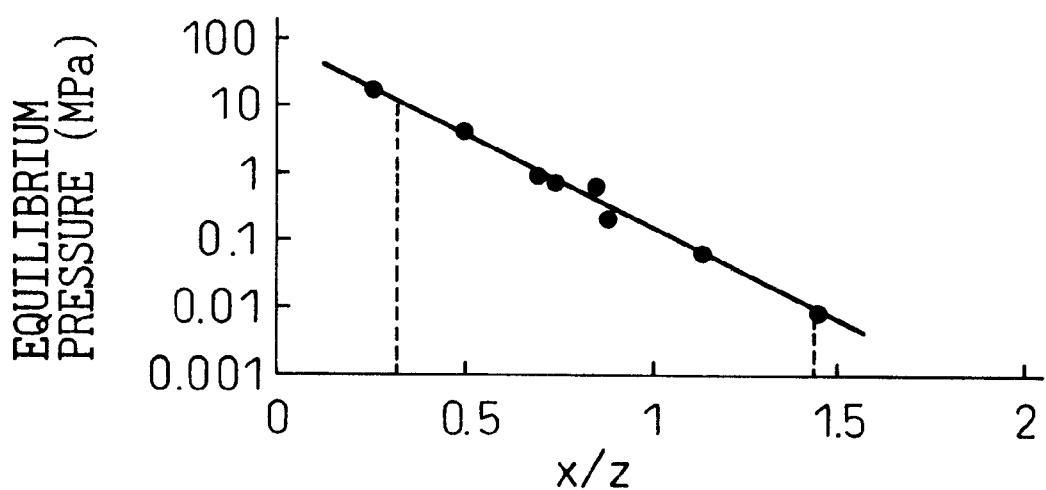
FIG. 4 is a diagram showing the relationship between the x/z value in a Ti-V-Cr-Fe-Ni system and the equilibrium pressure in Example 3 according to the present invention.

The x value in Table 3 and FIG. 4 is the sum of the group A elements and z is the sum of the group B elements. The equilibrium pressure is the value at the mid point of the plateau flat portion of the pressure-composition isothermal line at 40° C. It can be concluded in this case that the alloys could be applied to hydrogen tanks and to negative electrode materials of Ni-MH cells by controlling the temperature and the pressure in the system.

Furthermore, it was confirmed that the alloys of this Example exhibited the excellent equilibrium pressure described above, the phase of the body-centered cubic structure was at least 50% in terms of the phase fraction, and its lattice constant was at least 0.2950 nm but not greater than 0.3100 nm.

The present invention improves the problems of the BCC alloys in that the reaction rate is low, activation is difficult, and the absorption and desorption characteristics under the practical conditions are inferior, and the alloys of the present invention can be used as an electrode material of a hydride cell, too. According to the present invention, a hydrogen-absorbing alloy capable of exhibiting the excellent hydrogen absorption and desorption characteristics even when they contain Fe can be produced by using the BCC as the principal components, selecting the elements which can easily form the hydrides and those which cannot easily form the hydrides, and alloying them within the ranges of their specific proportion, the specific ratio and specific lattice constants.

What is claimed is:

1. A hydrogen-absorbing alloy consisting essentially of a composition expressed by the following general formula:

$$Ti_xV_yMn_{z1}Fe_{z2},$$

where z=z1+z2, x+y+z=100, x/z=0.25 to 2.0, x: 14 to 47, y: 16 to 40, and z: 31 to 64 in terms of the atomic number ratio;
the phase of a body-centered cubic structure which is at least 50% in terms of the phase fraction;
and the lattice constant which is 0.2950 nm to 0.3100 nm.

2. A hydrogen-absorbing alloy consisting essentially of a composition expressed by the following general formula:

$$Ti_xV_yMn_{z1}Fe_{z2},$$

where z=z1+z2, x+y+z=100, x/z=0.25 to 2.0, x: 15 to 40, y: 21 to 43, and z: 50 to 64 in terms of the atomic number ratio;
the phase of a body-centered cubic structure which is at least 50% in terms of the phase fraction;
and the lattice constant which is 0.2950 nm to 0.3100 nm.

3. A hydrogen-absorbing alloy consisting essentially of a composition expressed by the following general formula:

$$A_xVa_yB_z,$$

where A is at least one of Ti and Zr, Va is at least one of the Group Va elements of the Periodic Table consisting of V, Nb and Ta, B contains at least Fe and is at least one member selected from the group consisting of Cr, Mn, Co, Ni, Cu, Al, Mo and W, x, y and z satisfy the relations 0<x≦70, 0<y≦50, x+y+z=100 and x/z=0.25 to 2.0 in terms of the atomic number ratio;
the phase of a body-centered cubic structure which is at least 50% in terms of the phase fraction;
and the lattice constant which is 0.2950 nm to 0.3100 nm.

4. A hydrogen-absorbing alloy according to claim 3, wherein the two phases have different lattice constants and a periodical structure with spacing of 1.0 to 100 nm.

5. A hydrogen-absorbing alloy according to claim 3, wherein the two phases have lattice constants which differ by about 5/100 nm.

* * * * *